(12) United States Patent
Lin

(10) Patent No.: US 6,305,272 B1
(45) Date of Patent: Oct. 23, 2001

(54) ENERGY-EFFICIENT COOKER

(76) Inventor: Hsiu Man Lin, No. 469, Shu Wang Rd., Ta Li City, Taichung Hsien (TW)

( * ) Notice: Subject to any disclaimer, the term of this patent is extended or adjusted under 35 U.S.C. 154(b) by 0 days.

(21) Appl. No.: 09/838,029

(22) Filed: Apr. 20, 2001

(30) Foreign Application Priority Data

Jun. 28, 2000 (CH) .................................................. 00238485

(51) Int. Cl.⁷ .............................. A23L 1/00; A47J 27/00; A47J 27/10; A47J 27/21; B65D 51/16
(52) U.S. Cl. .............................. 99/371; 99/339; 99/340; 99/401; 99/403; 99/413; 99/447; 126/369; 126/377.1; 220/573.1; 220/573.4; 220/574.2; 220/912
(58) Field of Search .............................. 99/337, 339, 340, 99/403–418, 401, 444–450; 126/369, 377.1, 386.1, 384.1; 220/592.2, 574.2, 573.1–573.4, 23.87, 23.83, 212.5, 592.28, 912

(56) References Cited

U.S. PATENT DOCUMENTS

| 2,545,733 | * | 3/1951 | Hatfield | 220/574.2 |
|---|---|---|---|---|
| 2,683,974 | * | 7/1954 | Brown | 220/574.2 |
| 2,772,754 | * | 11/1956 | Winkler | 126/369 X |
| 3,109,359 | * | 11/1963 | Falla | 99/342 X |
| 3,636,860 | * | 1/1972 | Green | 99/483 X |
| 3,808,963 | * | 5/1974 | Ludena | 99/339 X |
| 5,031,519 | * | 7/1991 | Toida et al. | 99/340 |
| 5,092,229 | * | 3/1992 | Chen | 99/337 |
| 5,228,384 | * | 7/1993 | Kolosowski | 99/403 X |
| 5,235,904 | * | 8/1993 | Ludena | 99/413 |
| 5,355,777 | * | 10/1994 | Chen et al. | 99/403 X |
| 5,567,458 | * | 10/1996 | Wu | 99/340 X |
| 6,105,810 | * | 8/2000 | Daenen et al. | 220/912 X |

\* cited by examiner

Primary Examiner—Timothy F. Simone
(74) Attorney, Agent, or Firm—Harrison & Egbert

(57) ABSTRACT

An energy-efficient cooker is formed of a main body, an insulation body made integrally with the main body, a base body fitted over the bottom of the main body for making contact with a heat source, and a lid covering an open top of the main body. The main body is provided with a vacuum space which is partially filled with an action fluid to bring about a fast and uniform heat transfer. The insulation body, the base body and the lid are provided with a vacuum space to minimize the loss of heat of the food that is cooked and contained in the main body.

2 Claims, 4 Drawing Sheets

ENERGY-EFFICIENT COOKER

BACKGROUND OF THE INVENTION

1. Field of the Invention

The present invention relates generally to a cooking utensil, and more particularly to an energy-efficient cooker.

2. Description of Related Art

The conventional metal cooker is not energy-efficient in view of the fact that heat is slowly transferred from the bottom of the cooker to the entire body of the cooker, and that the heat transfer does not take place in a uniform pattern, and further that the cooker is not provided with means to prevent the heat loss.

BRIEF SUMMARY OF THE INVENTION

The primary objective of the present invention is to provide an energy-efficient cooker, which is formed of a main body, a base body, and a lid. The main body has an open top which is covered by the lid. The side wall and the bottom wall of the main body contain a vacuum space extending throughout the side wall and the bottom wall. The vacuum space is partially filled with an action fluid capable of effecting a fast and uniform heat transfer. The base body and the lid have a vacuum space. The main body is then provided with an insulation body circumventing the side wall of the main body. The insulation body contains a vacuum space. In light of the vacuum spaces of the base body, the lid, and the insulation body of the main body, the energy-efficient cooker of the present invention is capable of preventing the loss of heat.

The features and functions of the present invention will be more readily understood upon a thoughtful deliberation of the following detailed description of the present invention in reference to the accompanying drawings.

DETAILED DESCRIPTION OF THE INVENTION

Figure 1:
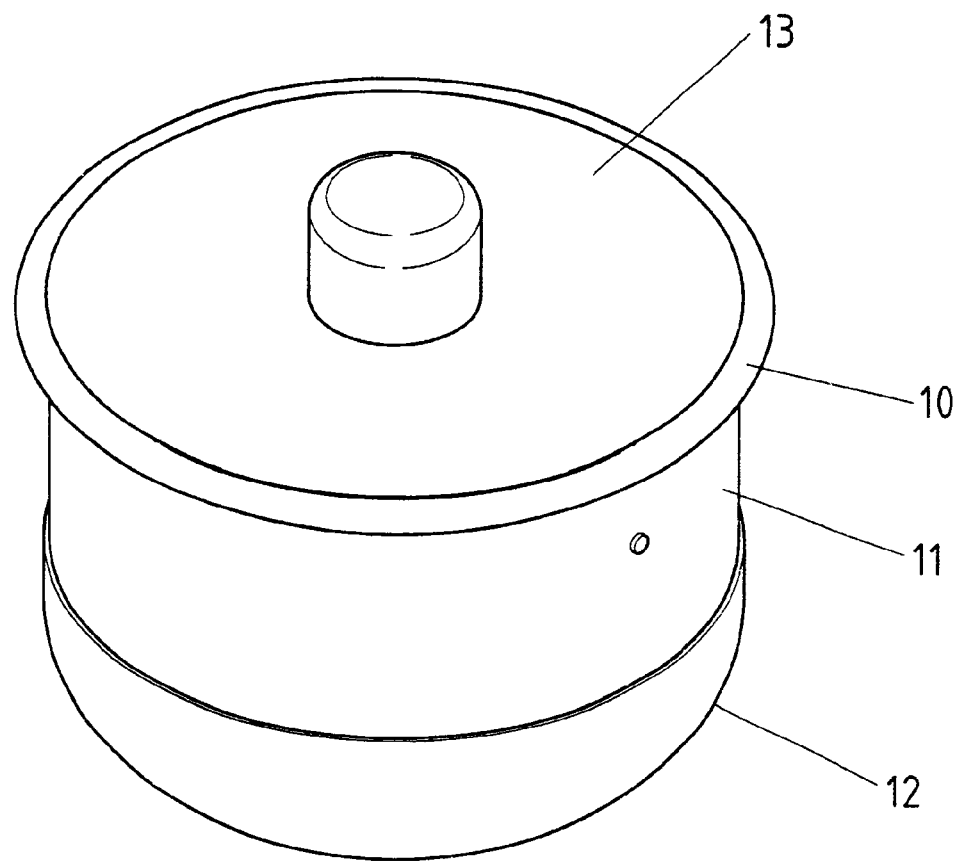
FIG. 1 shows a perspective view of an energy-efficient cooker of the present invention.
Figure 2:
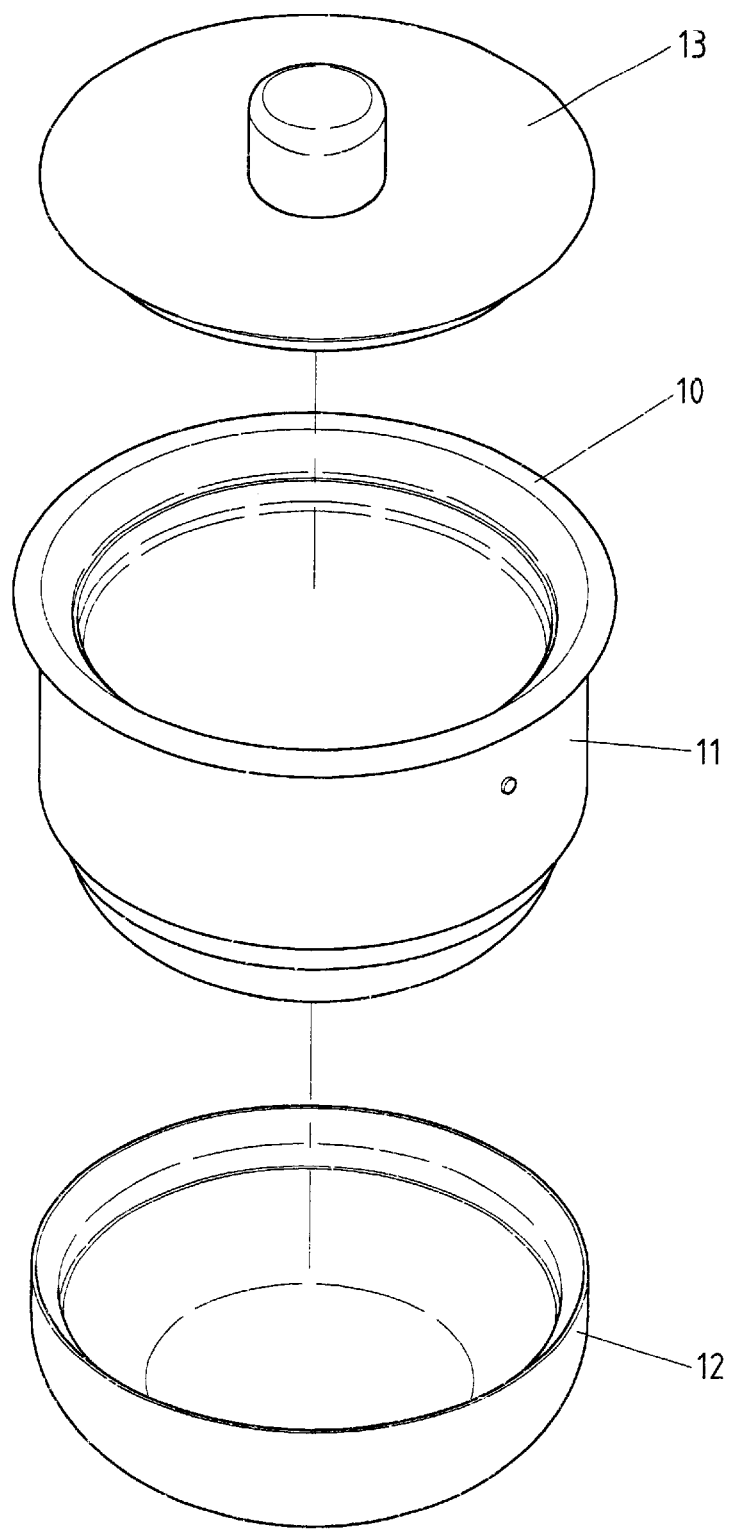
FIG. 2 shows an exploded view of the energy-efficient cooker of the present invention.

As shown in FIGS. 1–4, an energy-efficient cooker embodied in the present invention is formed of a main body 10, a base body 12, and a lid 13.

The main body 10 is a container with an open top. The open top of the main body 10 is covered by the lid 13. The main body 10 has a side wall and a bottom wall extending from the side wall. The side wall and the bottom wall of the main body 10 have a predetermined thickness and a vacuum space extending throughout the interiors of the side wall and the bottom wall. The vacuum space of the main body 10 is partially filled with an action fluid 14 capable of effecting a fast and uniform heat transfer. Preferably, the vacuum space of the main body 10 is partially filled with the action fluid 14 in such a fashion that the action fluid 14 takes up 20% of a total volume of the vacuum space. The main body 10 further has an insulation body 11 which is integrally made with the side wall of the main body 10 such that the insulation body 11 circumvents the external side of the side wall. The insulation body 11 encloses a vacuum space.

Figure 4:
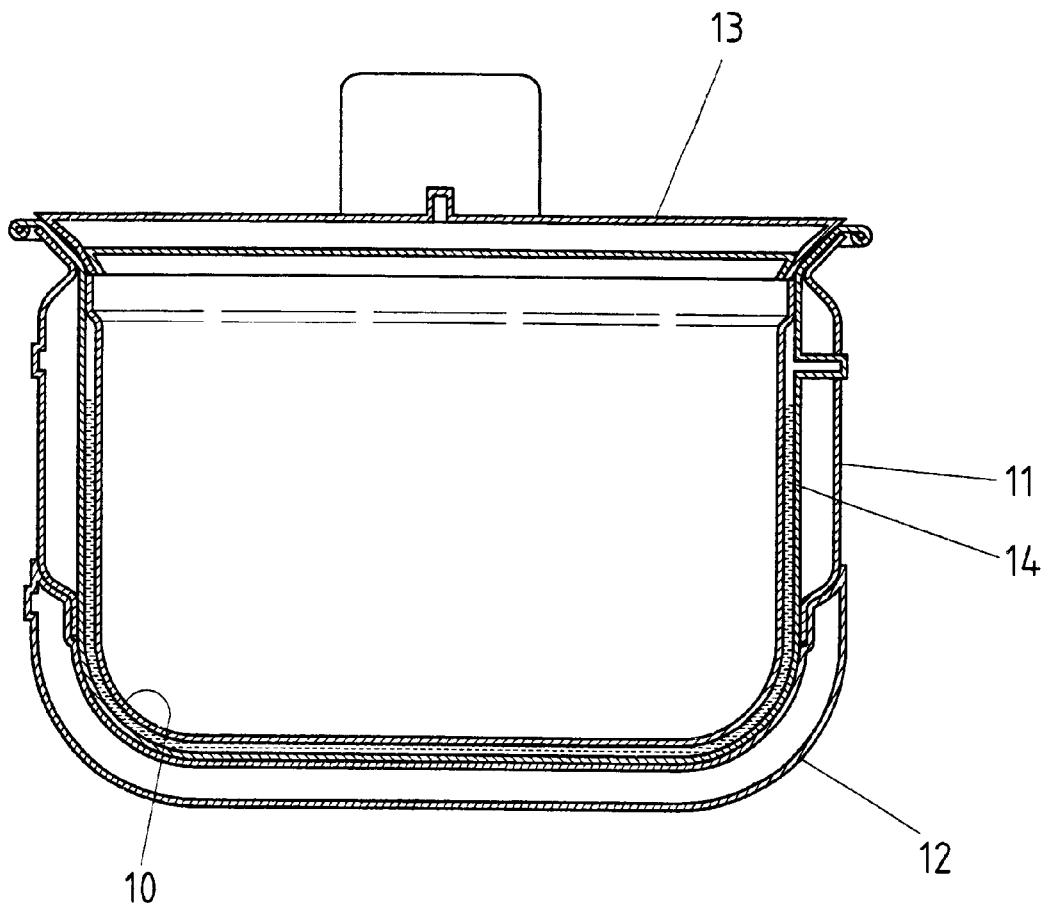
FIG. 4 shows a longitudinal sectional view of the energy-efficient cooker of the present invention in its entirety.

The base body 12 is dimensioned to fit over the bottom wall of the main body 10 such that the top edge of the base body 12 is joined with the bottom edge of the insulation body 11 of the main body 10, as shown in FIG. 4. The base body 12 has a predetermined thickness and a vacuum space extending throughout the interior of the base body 12.

Figure 3:
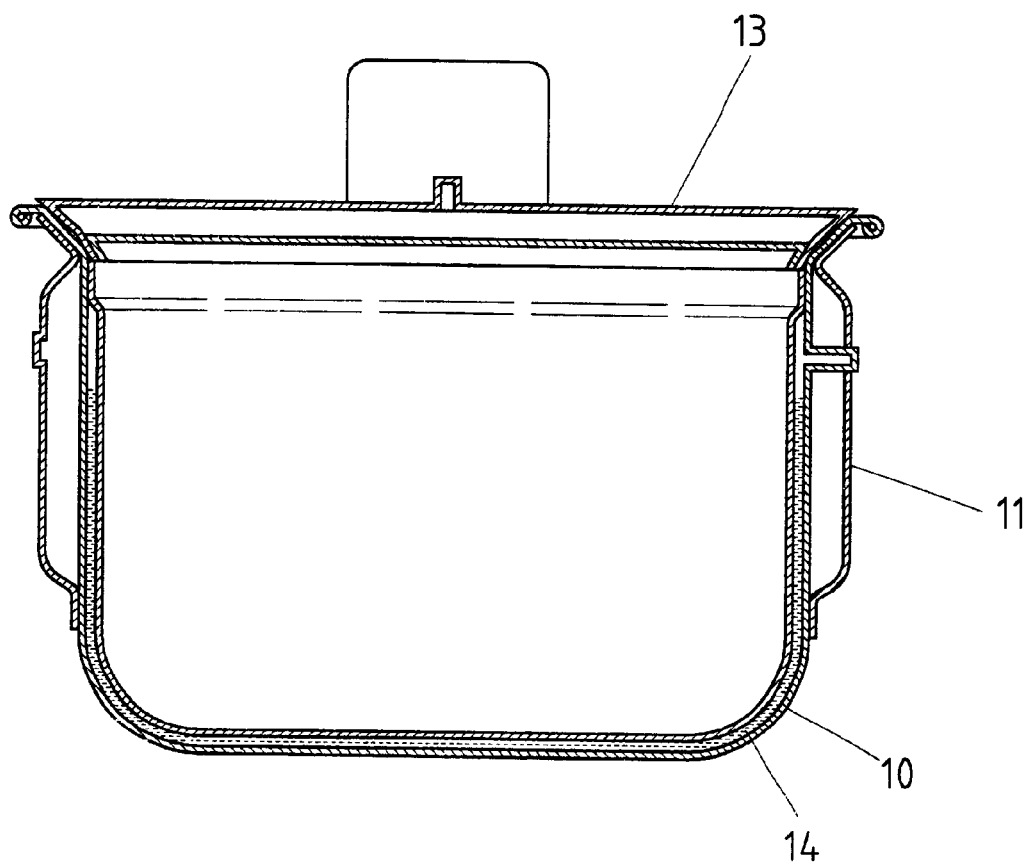
FIG. 3 shows a longitudinal sectional view of the energy-efficient cooker of the present invention without the base body.

The lid 13 has two walls enclosing a vacuum space, as shown in FIGS. 3 and 4.

When the base body 12 of the energy-efficient cooker of the present invention is in contact with a heat source, the action fluid 14 of the main body 10 is heated to evaporate so as to bring about a fluid action effect, thereby resulting in a fast and uniform transfer of heat from the heat source to the main body 10 in which food is cooked. In light of the action fluid 14 capable of a fast and uniform transfer of heat, the cooker of the present invention is energy-efficient. When the action fluid 14 takes up only 20% of the total volume of the vacuum space of the main body 10, the action fluid 14 undertakes a "phase change" heat transfer effect at the time when the action fluid 14 is heated by the heat source via the base body 12.

In view of the fact that the main body 10, the insulation body 11, the base body 12, and the lid 13 are provided with the vacuum space, the energy-efficient cooker of the present invention can minimize the loss of heat of the food that is cooked and contained in the main body 10. The insulation body 11 of the main body 10 also serves to prevent the hands of a person from being burned at such time when the person holds the cooker.

The cooker of the present invention saves not only energy but also time to cook the food.

The cooker of the present invention described above is to be regarded in all respects as being merely illustrative and not restrictive. Accordingly, the present invention may be embodied in other specific forms with deviating from the spirit thereof. The present invention is therefore to be limited only by the scopes of the following claims.

I claim:

1. An energy-efficient cooker comprising:

a main body for containing food to be cooked, said main body having an open top, a side wall, and a bottom wall extending from said side wall, said side wall and said bottom wall having a thickness, an interior, and a vacuum space extending throughout said interior, said vacuum space being partially filled with an action fluid capable of effecting a fast and uniform heat transfer, said main body further having an insulation body whereby said insulation body is integrally made with said side wall of said main body such that said insulation body circumvents an external side of said side wall, and that said insulation body encloses a vacuum space;

a base body fitted over said bottom wall of said main body such that a top edge of said base body is joined with a bottom edge of said insulation body of said main body, said base body having a thickness, an interior, and a vacuum space extending throughout said interior of said base body; and a lid for covering said open top of sad main body, said lid having two walls enclosing a vacuum space.

2. The energy-efficient cooker as defined in claim 1, wherein said action fluid takes up 20% of a total volume of said vacuum space of said main body.

* * * * *